United States Patent

[11] 3,610,604

| [72] | Inventor | Kazuo Terai<br>Kakamigahara, Japan |
|---|---|---|
| [21] | Appl. No. | 849,758 |
| [22] | Filed | Aug. 13, 1969 |
| [45] | Patented | Oct. 5, 1971 |
| [73] | Assignee | Kawasaki Heavy Industries, Ltd.<br>Kobe, Japan |

[54] METHOD AND MEANS FOR ISOLATING VIBRATION AND SHOCK
8 Claims, 5 Drawing Figs.

| [52] | U.S. Cl. | 267/9 B, 188/1 B |
|---|---|---|
| [51] | Int. Cl. | F16f 7/08 |
| [50] | Field of Search | 188/1 B, 1 C, 129; 248/358; 267/9 A, 9 B, 22 |

[56] References Cited
UNITED STATES PATENTS

| 1,140,101 | 5/1915 | Bauer | 267/9 B |
| 2,189,208 | 2/1940 | Holland | 267/9 B |
| 2,411,279 | 11/1946 | Lehman | 188/1 B UX |
| 3,164,222 | 1/1965 | Conrad | 188/1 C |

Primary Examiner—Duane A. Reger
Attorney—Wenderoth, Lind & Ponack

ABSTRACT: Method and means for isolating and absorbing vibration by making use of the friction between confronting filamentary materials extending normally outwardly from respective sides of a pair of base members which are arranged so as to make a relative movement upon being subjected to a vibration or a shock.

PATENTED OCT 5 1971

KAZUO TERAI, INVENTOR

By Wenderoth, Lind & Ponack attys

KAZUO TERAI, INVENTOR

METHOD AND MEANS FOR ISOLATING VIBRATION AND SHOCK

The present invention relates to damping or absorbing vibration, and more particularly but not exclusively relates to a method and means adapted for application to the shock mounts of instrument panels in aircraft or the like.

DESCRIPTION OF THE PRIOR ART

As a system for damping or absorbing vibration, recoverable resilient elements, such as spring and rubber, viscous substances, such as liquid or gas, and dampers making use of the frictional resistance of solid material have been used heretofore either singly or in combination. However, the systems using springs or rubber have the drawbacks that damping efficiency is low and that rebound is large since the energy dissipation efficiency is also low, although there is the advantage that the resonance frequency can be selected at a low value. The viscous dampers which are most widely being used show an excellent performance in damping vibration or shock but are complicated in construction and large in size and are defective in that they often show performance variation and fluid leakage caused by temperature change. Furthermore, the viscous dampers of the type described are expensive per se and call for periodical exchange of the viscous fluid used. The conventional solid friction dampers, on the other hand, have a high damping efficiency and an excellent energy dissipation efficiency but they have present problems of wear of the friction members and have the disadvantages of low damping effect, heat generation and irregularity in performance.

The primary object of the present invention is to eliminate the above-described drawbacks of the conventional vibration-isolating and shock-absorbing systems.

Another object of the invention is to provide a novel vibration-isolating and shock-absorbing system which is simple in structure and has an excellent vibration-isolating and shock-absorbing characteristic and durability.

According to the present invention, two brushlike parts, each consisting of a base member having a large number of filamentary materials projecting outwardly from one side thereof, are arranged with the tip ends of the filamentary materials of said respective parts confronting each other, whereby when the brushlike parts are subjected to a vibration, the filamentary materials of both parts contact each other frictionally, thus producing a damping force.

The aforesaid filamentary materials may be natural or synthetic fibers. Alternatively, a fine metallic wire, such as steel wire, may also be used as the occasion demands. In a preferred embodiment of the present invention, the filamentary materials are provided on each baseplate in a plurality of regularly spaced bundles. However, it is to be understood that the filament bundles may be arranged randomly or the filamentary materials may be uniformly distributed over the entire surface of the baseplate without forming them into bundles.

The system of the present invention is normally used in combination with a resilient element such as a spring as it does not have a recovering property per se. However, it should be noted that a sufficiently practical system may be obtained without using any spring.

A preferred embodiment of the present invention will be described hereunder with reference to the accompanying drawings merely for the purpose of illustration.

Figure 1:
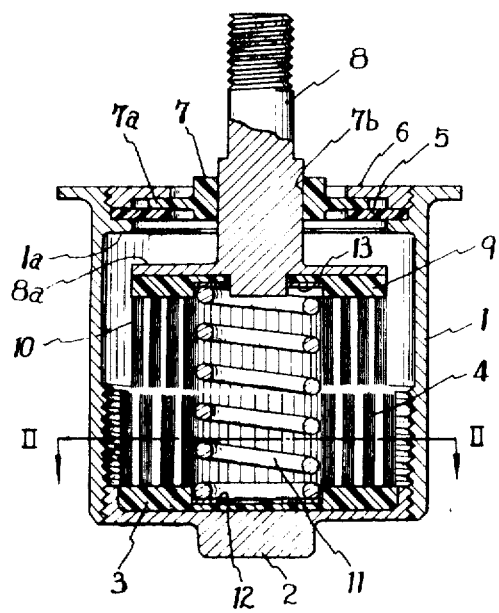
FIG. 1 is a vertical sectional view of a vertical shock mount for aircraft instrument panels, in which the principle of the present invention is embodied.
Figure 2:
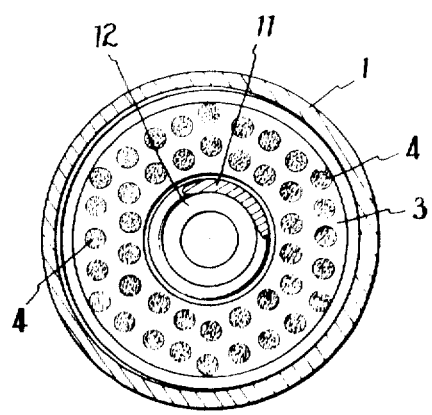
FIG. 2 is a horizontal sectional view taken along the lines II—II of FIG. 1.

Referring to FIG. 1, there is shown a shock mount which includes a substantially cylindrical hollow casing 1. The casing 1 is open at its lower end, into which a plug 2 is screw threaded. Interior of the casing 1 is provided a stationary brushlike member according to the present invention, which rests on the plug 2. This brushlike member consists of a baseplate 3 and filamentary materials 4 extending normally outwardly from one side of said baseplate. As shown in FIG. 2, the filamentary materials 4 are arranged in a plurality of regularly spaced bundles. At the open top end of the casing 1 is provided a guide member 7 having an outwardly extending flange 7a. The guide member 7 is disposed between a seat ring 5, resting on an annular, inwardly facing shoulder 1a formed on the interior wall of the casing 1, and an annular member 6 screw threaded into said casing. A movable brush holder 8 is slidably extends through the central hole 7b of the guide member 7. The brush holder 8 has a disc portion 8a located interior of the casing 1 and by which a movable brushlike member according to the present invention is supported. The movable brushlike member consists of a base member 9 supported by the aforesaid disc portion 8a and filamentary materials 10 extending normally outwardly from said base member. Reference numeral 11 designates a return spring which acts between a steel spring seat 12 on the base member 3 and another steel spring seat 13 on the base member 9.

In use of the shock mount having a construction as described above, the casing 1 is secured, for example, to the structural frame of an aircraft or to a member fixed to the said structural frame, and the holder 8 is secured, for example, to an instrument panel or the like part. In the installed position, the shock mount is held with the filamentary materials 4 and 10 contacting with each other at their tip ends. When the instrument panel vibrates relative to the body of aircraft, the brushes or the filamentary materials 4 and 10 move relatively in frictional contact with each other and thereby damp the vibration.

Figure 3:
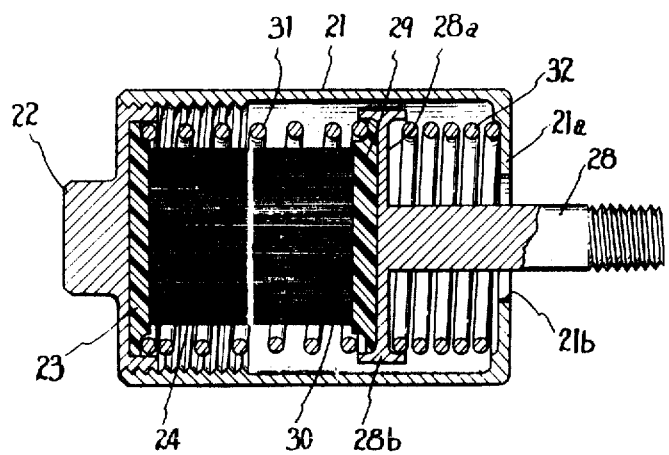
FIG. 3 is a vertical sectional view of a horizontal shock mount for aircraft instrument panels, in which the principle of the present invention is embodied.

FIG. 3 shows a horizontal shock mount is which the principle of the present invention is employed. This shock mount includes a substantially cylindrical hollow casing 21, and a supporting plug 22 is screw threaded into the left side end of said hollow casing 21 for supporting a base member 23 which is provided with normally outwardly extending filamentary materials 24. At the right side end of the casing 21 is formed an end wall 21a having a hole 21b formed centrally thereof, and a movable brush holder 28 extends through said hole 21b of the end wall 21a. The brush holder 28 is formed with a disc portion 28a, which is located interior of the casing 21 and formed with a rim 28b peripherally thereof. As shown, the disc portion 28a supports a base member 29 having filamentary materials 30 extending normally outwardly therefrom. Reference numeral 31 designates a return spring and 32 designates a balance spring. This shock mount is functionally the same as the shock mount shown in FIGS. 1 and 2, the only difference therebetween being that the former is used in a horizontal position.

Figure 4:
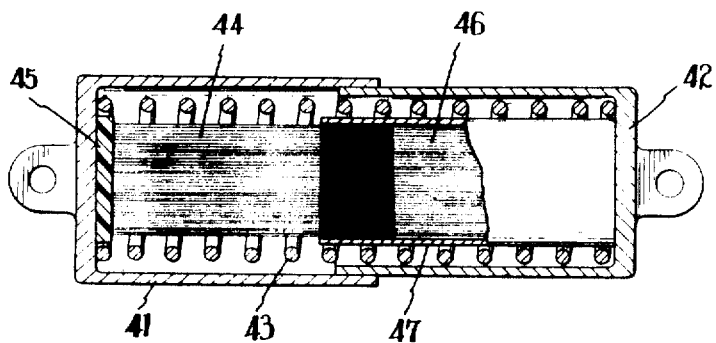
FIG. 4 is a vertical sectional view illustrating the principle of the present invention as applied to a system having a large stroke.

FIG. 4 shows an embodiment in which the present invention is applied to a shock mount of longer stroke than the shock mounts shown in FIGS. 1 to 3. The shock mount of this embodiment comprises two hollow casings 41, 42 which are extensibly and contractibly combined with each other in a telescoped fashion at their open ends. The telescopic casing assembly is urged in an extending direction by a coil spring 43 disposed therein. A base member 45 having filamentary materials 44 fixed thereto is secured to the end wall 41 of the casing 41, while a base member (not shown) having filamentary materials 46 fixed thereto is secured to the end wall of the casing 42. These filamentary materials 44, 46 are longer than those in the embodiments of FIGS. 1 to 3. One of the casings, which in this embodiment is the casing 42, is provided therein with a cylindrical member 47 surrounding the filamentary materials 46. This cylindrical member 47 serves to prevent bending of the filamentary materials due to buckling.

Figure 5:
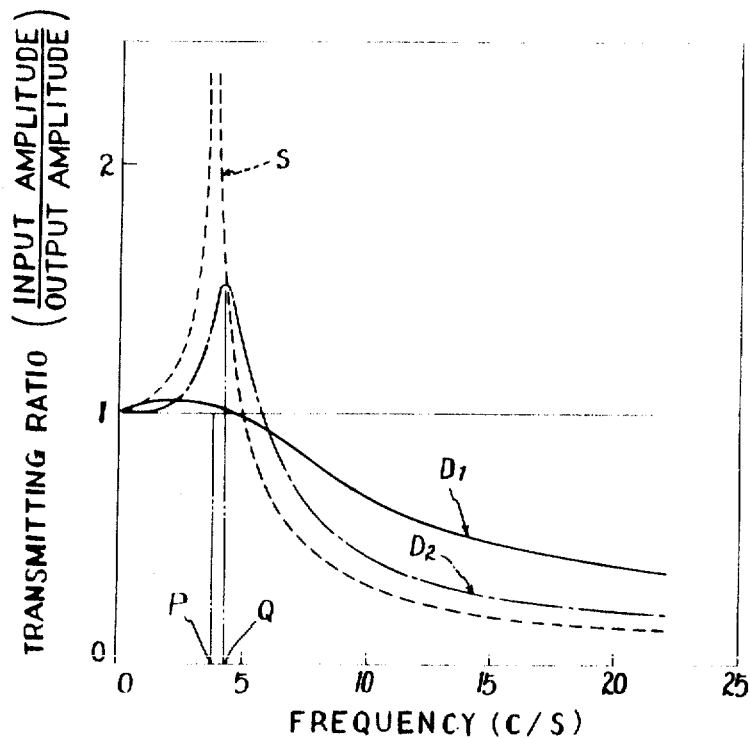
FIG. 5 is a diagram showing the characteristic curve of the present shock mount in comparison with that of the ordinary spring.

The representative characteristics of the shock mount according to the invention are shown in FIG. 5. Namely, FIG. 5 is a diagram showing the characteristic curve of the vibration-isolating system according to the present invention and the characteristic curve of a vibration-isolating system using a spring singly, which were obtained through experiments. In the diagram, the characteristic curve S of the spring, indicated by the broken line, shows the characteristic curve of the ordinary spring system, i.e., the curve has a resonance point P in the proximity of a frequency of 4 cycles per second, at which the transmissibility (the input to output ratio) increases sharply, and from that point the transmissibility decreases as the frequency increases and approaches zero after passing a value of 1. With the vibration damping system according to the present invention, in contrast thereto, when the amplitude (velocity in this case) of the input is 1.25 sec., the characteristic curve thereof, indicated by the solid line $D_1$, does not form a distinct resonance point, the transmissibility being slightly greater than one at a frequency of about 2 c.p.s. and in case of the input amplitude being 2.5 cm./sec., the characteristic curve has a resonance point Q, as indicated by the chain line $D_2$, in the vicinity of a frequency of 4 to 5 c.p.s. which is substantially the same as the resonance frequency of the system consisting solely of spring, and the transmissibility at this point is as low as 1.5. Thus, the present inventors have found that the vibration-damping system according to the present invention holds the resonance point at a low level as compared with the system consisting of a spring only, and yet further is capable of maintaining the maximum transmissibility at such a very effective value as 1.5 or smaller.

According to the present invention, as stated previously, an external force, such as vibration or shock, is damped or absorbed by the frictional resistance of the filamentary materials. Therefore, the present system is totally different in the manner of isolating vibration or absorbing shock from the conventional springs, rubbers, pneumatic springs, viscous dampers or friction dampers, and enables markedly improved vibration-isolating and shock-absorbing characteristics to be obtained. Namely, the vibration-isolating and shock-absorbing system according to the present invention brings about such outstanding advantages that it is highly effective against velocity shock, that it is free of wear of frictional members or noise as has been experienced with the ordinary friction damper and accordingly free of characteristic variation caused by deformation or aging of the friction surfaces; that it is highly suitable for use with vehicles for isolating vibration and absorbing shock because, while it is not so sharply responsive to small amplitudes or microvibrations, it has a large braking force against an external force of large amplitude; that there is substantially no tendency of heat being generated and the heat, if generated, can be readily radiated since the heat-radiating area is large; that it has a considerable freedom and vibration damping and shock-absorbing ability with respect not only to an external force exerted thereon in an axial direction but also to an external force exerted in a direction perpendicular to the axis thereof; that it can be installed both horizontally and vertically; that it is free of fluid leakage and corrosion of casing and does not necessitate exchanging of fluid and the provision of a sealing mechanism as in the case of fluid dampers, and is simple in structure, light in weight and low in cost; that the braking force and damping force are large for its small size and compact form; that by combining it with a recovering element and an energy absorbing element to form a vibration-isolating and shock-absorbing system, it is possible to hold the resonance point low and also to maintain the maximum transmissibility at a very low value, e.g., 1.5 or smaller; that effective utilization of space can be attained; that it has an excellent durability and finally, that the characteristic change is minimum with respect to a temperature change form high temperatures to low temperatures.

Owing to the numerous excellent advantages as set forth above, the vibration-isolating and absorbing system according to the present invention can be used widely and easily in various fields as a shock absorber for vehicles, such as aircraft, rolling stocks, automotive vehicles and motorcycles, as a vibration-isolating and absorbing system for the instruments and equipments installed on said vehicles, as a shock absorber for the seats of said vehicles, as a buffer for industrial machinery and prime movers, such as machine tools, printing machinery, textile machinery, machinery for agriculture and forestry and pumps, and further as a buffer for record players.

What is claimed is:

1. Method for isolating and absorbing vibration, said method comprising the steps of arranging a pair of base members each having a plurality of filamentary materials extending normally outwardly from one side thereof such that the tip ends of said filamentary materials confront each other, and causing said filamentary materials on said respective base members substantially unrestrictedly contact each other and thereby damp vibration force by the frictional force of said filamentary materials.

2. Means comprising first brushlike means having a plurality of filamentary materials extending in one and the same direction, second brushlike means having a plurality of filamentary materials arranged with their free ends confronting the free ends of said filamentary materials of said first brushlike means, and means for supporting said first and second brushlike means for free relative movement, the filamentary materials of said respective brushlike means adapted to substantially unrestrictedly contact each other incident to said relative movement of said means to produce a damping force by friction.

3. Means as defined in claim 2, in which yieldable means is provided by which said first and second brushlike means are normally retained in a neutral position.

4. Means as defined in claim 3, in which said yieldable means is a coil spring.

5. Means for isolating and absorbing vibration, said means comprising a hollow casing, a stationary base member having a multiplicity of filamentary materials extending normally outwardly from one side thereof in the shape of a brush, said base member being secured to said casing at a location approximating to one end thereof with the filamentary materials extending in parallel to the longitudinal axis of and inwardly of said casing, and a movable base member disposed in said casing and having filamentary materials arranged in confronting relation to the filamentary materials on said stationary base member, said movable base member being provided with a pin extending outwardly through said casing.

6. Means as defined in claim 5, in which said movable base member is provided with yieldable means to urge it away from said stationary base member.

7. Means as defined in claim 5, in which is provided a hollow member arranged to surround the filamentary materials on at least one of said stationary and movable base members.

8. Means as defined in claim 5, in which the filamentary materials on each of said stationary and movable base members are arranged in a plurality of bundles arranged regularly on said base member.